United States Patent Office 3,101,707
Patented Aug. 27, 1963

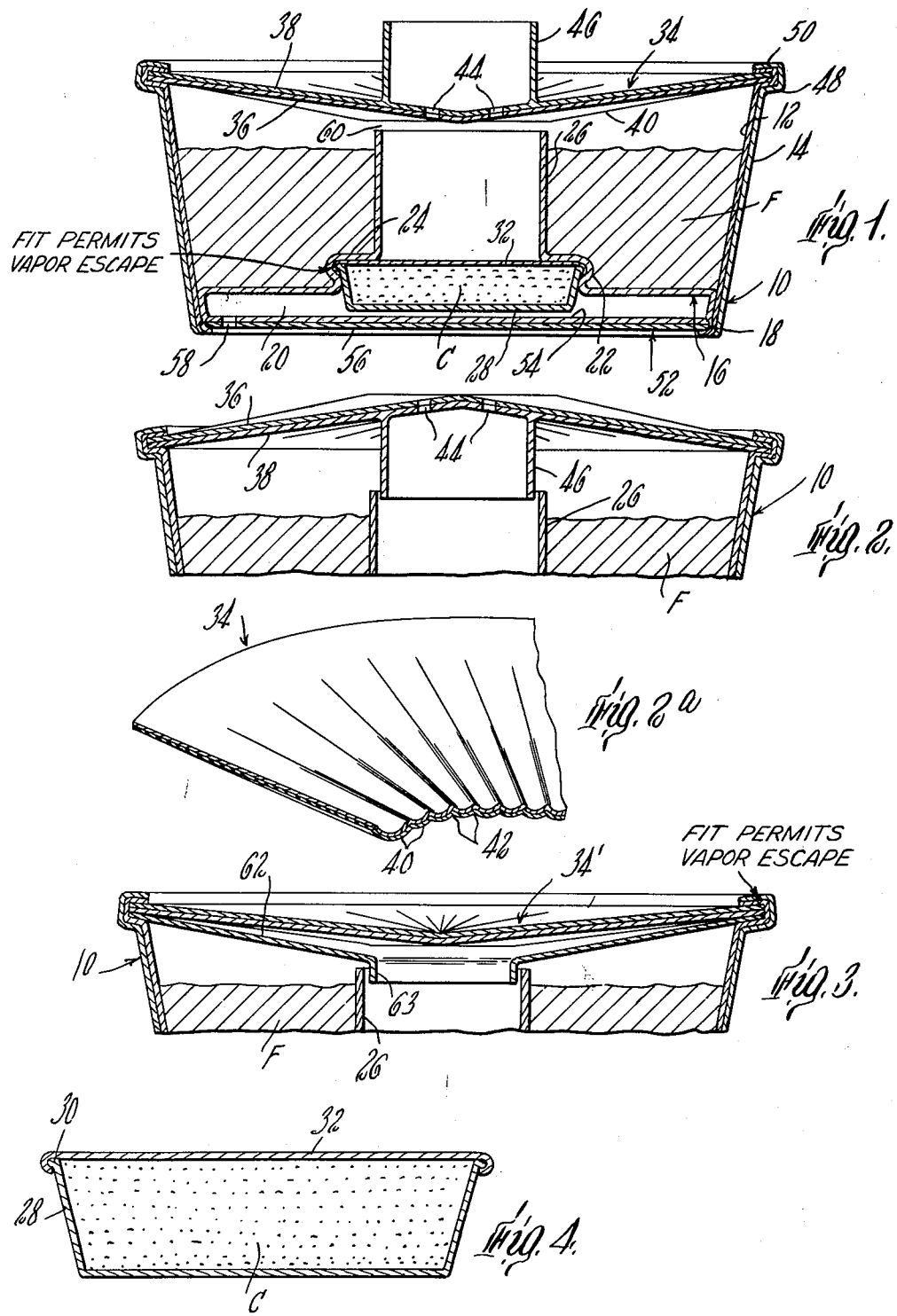

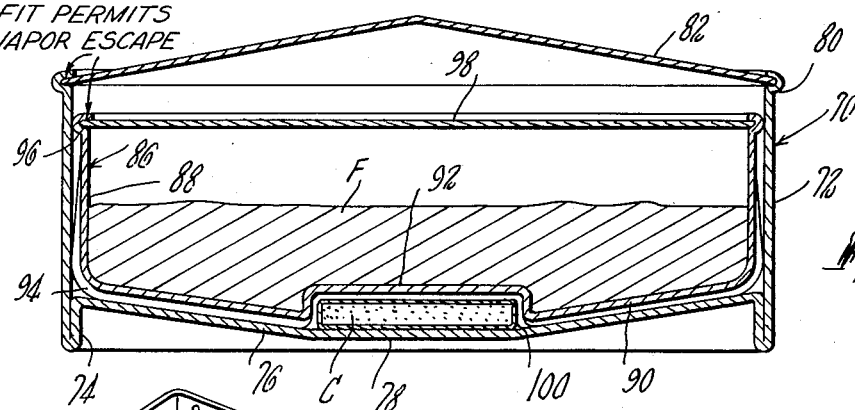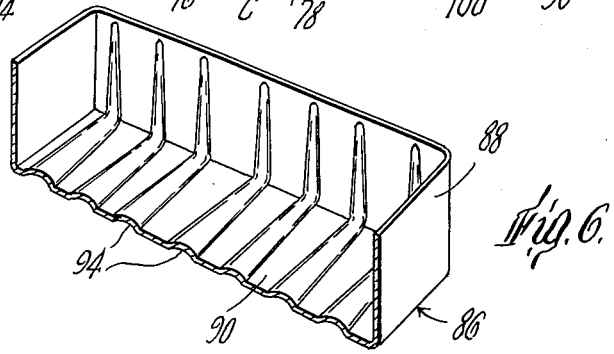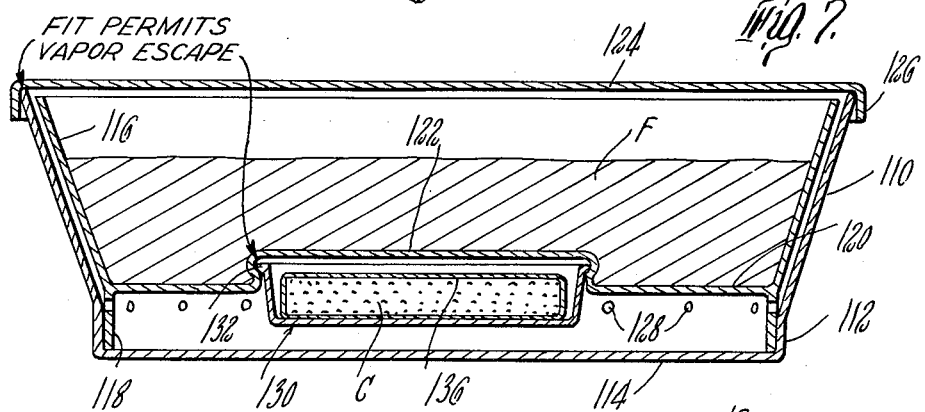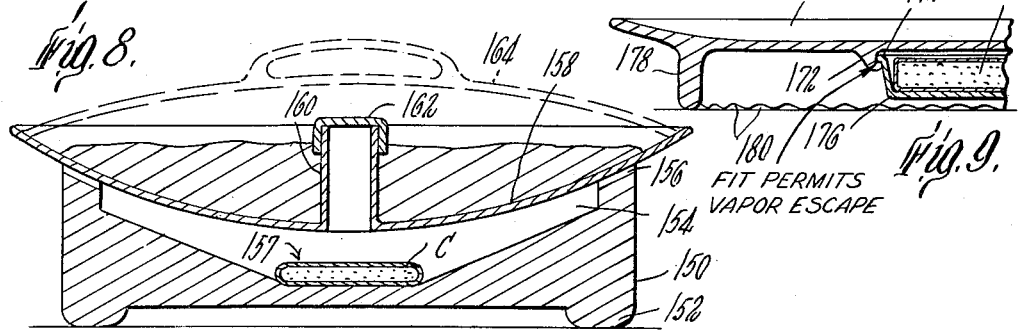

3,101,707
FOOD HEATING DEVICES
Edward C. Ryan, 531 Wellington, Apt. 3, Chicago, Ill., and Raymond E. Reed, Barrington, Ill.
Filed Feb. 18, 1960, Ser. No. 9,595
10 Claims. (Cl. 126—263)

This invention relates to the heating of foods or the like for warming or cooking purposes, and especially to the keeping of cooked foods (including beverages) hot until they are served. Particularly, the invention concerns the effective utilization of exothermic chemical reaction and heated vapor therefrom as the heating means for the foregoing and analogous purposes. The application is a continuation-in-part of our application Serial No. 825,306, filed July 6, 1959, now Patent No. 3,079,-911, issued March 5, 1963.

For many years the take-out marketing of freshly cooked foods which should be served warm or hot has been hampered by the lack of any practical means for keeping them edibly hot or warm while they are transported from shop to home or other place where they are to be consumed. Despite improvements in heat-insulating packaging, the foods usually become too cool to be appetizing during the relatively long time that normally elapses between the time they are dispensed and the time they are eaten. Consequently, reheating becomes necessary, which not only involves taste loss inherent in any warmed-over meal, but also requires cooking facilities which may not be available, as in the case of picnics.

While chemical heating has been successfully employed for many years in the body warming and hair waving arts, it has found no significant use in the field of food warming and cooking which would appear to offer an even greater opportunity. Hotels for their room service, hospitals and other institutions continue to rely on portable warming ovens or carts which, in addition to being cumbersome, are generally inefficient, being prone to overcook or dry-out the foods or fail to keep them hot enough. Restaurants attempt to provide hot service of food by oven-heating the platters or plates, which is not only injurious to china but also renders the service difficult to handle for the waiters and is ineffective for more than short periods of service delay. The take-out customer of hot, cooked foods or beverages, despite insulated packaging, usually faces the necessity of reheating by the time he reaches his home or other eating place, with loss in palatability and even in food quality due to the cooling and reheating. The picnicker, needing to heat foods or beverages, must rely on some portable stove or campfire.

Suggestions have been made by others for adapting chemical heating media to the cooking or warming of foods but these have not proved commercially acceptable. One reason is that most of the suggested devices are intended, and would be useful only for, heating foods contained in hermetically sealed tin cans, a very limited application at best. Another serious difficulty with devices proposed by others for the present purpose is that in general they have been complex and inefficient, involving substantial increases in weight and bulk, and the use of large quantities of chemicals distributed over large areas of the container to be heated. These were not only impractical to activate uniformly and completely, but were also altogether too costly to be practical for purposes of the present invention, where low cost is essential. Yet another problem has been the failure of the art heretofore to provide a heating composition which would supply the requisite heat for the relatively long times that may be required for our purposes.

One object of the present invention is to provide for more effective generation and utilization, for food warming and cooking purposes, of hot vapors (usually steam) resulting from exothermic chemical reaction, to provide substantial increase in heat transfer over that available by conduction and radiation. In our aforesaid application we have disclosed a chemical composition for warming foods which generates large quantities of steam that is utilized to aid, by heat of condensation, the heating of food through the container bottom. We have found that heat transfer from the vapors generated by exothermic chemical reaction, and particularly by steam condensation, can be utilized to substantially greater advantage in food heating than has heretofore been realized, thus effecting important reduction in the amount of chemical required for effective heating of a given volume of food. Accordingly, a major purpose of the present invention is to provide devices for more effectively utilizing vapors, particularly steam, from exothermic chemical reaction as a heating medium for the warming or cooking of foods.

As previously noted, prior workers in the art of food heating by exothermic chemical reaction have devoted their efforts largely to such heating of foods in hermetically sealed containers. Moreover, in any case precautions were taken to shield the food from contact with the vapors emanating from the reactive mixture, in the evident belief, probably justified, that any substantial exposure of foods to the vapors from the chemical mixtures proposed for heating purposes would contaminate the foods. An important aspect of the present invention is our discovery that chemical compositions suitable for keeping foods hot or cooking them for long sustained periods by exothermic chemical reaction can be so formulated that the vapors emanating therefrom are free of any substance which would contaminate food on direct and prolonged exposure thereto, using the word "contaminate' in the sense of appreciably adversely affecting the taste, odor, appearance or wholesomeness of food. For example, tests of the preferred heating composition disclosed in our aforesaid prior application have demonstrated that the vapors thereby generated during the heating cycle are only steam, that is, distilled water with hydrogen and oxygen which, because of their nature and volatility, are not potential food contaminants. This is partly due to the presence in sufficient quantity of an adsorptive agent which eliminates, by adsorption, other components of the vapors produced by the reaction. But even without the adsorptive agent, the vapors given off by that composition include, in addition to steam and hydrogen, only small amounts of chlorine, less in proportion to the water given off as steam than is present in tap water in some sections of the country, and of hydrochloric acid, which is a principal agent in the digestive process and certainly not deleterious to foods in the minor amount involved.

We have found that by exposing foods to be cooked or warmed directly to the vapors from such an exothermically reacting chemical mixture, very substantial improvement may be realized in the heating effectiveness of the chemical reaction. Accordingly, another object of the invention is to provide chemical compositions for heating foods by exothermic reaction which produce vapors innocuous to foods and, in combination therewith, food heating devices which increase the food heating capacity of the chemical reaction by effectively conducting hot vapors emanating therefrom into direct heat-exchange contact with the food.

Another object of the invention is to improve the efficiency for our purposes of chemical heating by effectively utilizing heated vapors therefrom, and particularly steam condensation, as a means of heating walls of the food receptacle which are in contact with or exposed to the food. Such vapor heating may be applied externally to the receptacle walls or, in accordance with another aspect of our invention previously mentioned, may be applied internally thereto, or may be applied both externally and internally. It may be used to augment, or even to replace, heating by conduction and radiation from the reacting chemical. We have found that effective utilization of vapor heating by means of the structures of our invention produces surprisingly great increases in the receptacle wall area, and consequently in the volume of food, that is adequately heated by a given quantity of reacting chemical, thus speeding the heating and effecting substantial reductions in the amount of chemical required as well as permitting it to be localized in a relatively small area, all highly desirable results. Moreover, the heating is uniformly at approximately the boiling point of water, which is about the temperature maintained by our preferred reactive mixtures.

The capacity of our chemical heating mixtures to generate continuously large quantities of steam is highly desirable where the steam is effectively used for heating purposes in accordance with our invention. However, the corresponding loss of water from the reactive mix tends to dry it out before the reaction is complete, thus undesirably tending to terminate the heating cycle before the capacity of the mix for exothermic reaction is completely spent. This problem can in part be resolved by wetting the mixture at the outset with enough excess water, above the quantity suitable for obtaining complete reaction if it were all retained, to make up for some of the steam loss. However, this increases the load on the heating composition and may produce excessive steaming, so that there is not much net gain in over-all heating performance and effective life, and, in addition, there may be excessive boiling out of possible food contaminants. A better solution to the problem is to re-wet the mixture when the initial supply of water is nearly spent and certain embodiments of our invention include structure which advantageously facilitates such re-wetting. However, this requires supervision by the user which is undesirable and moreover, re-wetting may not be feasible, as during the carrying of hot foods to the home, and may involve heat losses due to opening of the package.

We have found that a much more satisfactory solution to the problem is to provide means for automatically supplying to the chemical mixture, during its reaction cycle, water to replace water that has been given off as steam. Accordingly, another object of this invention is to provide, in devices for heating food by exothermic reaction, novel structure by which water (or other activating liquid) which volatilizes and escapes from the reactive mixture, is automatically replenished periodically or continuously during the reaction, particularly in the later stages, to such an extent as to permit the capacity of the chemicals for exothermic reaction to be completely exhausted, or substantially so.

The foregoing and other objects and advantages of the invention will be more fully apparent from the following particular description, in conjunction with the appended drawings showing preferred embodiments with which the novel principles of the invention may be utilized and advantages thereof obtained. In the drawings:

FIG. 1 is a view in vertical cross-section of one embodiment;

FIG. 2 is a fragmentary vertical cross-section view of the embodiment of FIG. 1 with the cover reversed;

FIG. 2a is a fragmentary perspective view of the cover of the embodiment of FIG. 1;

FIG. 3 is a fragmentary vertical cross-section view of the embodiment of FIG. 1 with a modified cover;

FIG. 4 is an enlarged vertical cross-section view of the chemical heating element shown in FIG. 1;

FIG. 5 is a vertical cross-section view of another embodiment;

FIG. 6 is a fragmentary perspective view of part of the device shown in FIG. 5;

FIG. 7 is a vertical cross-section view of another embodiment;

FIG. 8 is a view in vertical cross-section of still another embodiment of the invention;

FIG. 9 is a fragmentary vertical cross-section view of a further embodiment.

In the embodiment shown in FIGS. 1–4 of the drawings, the receptacle 10 is in the form of a dish of circular cross sectional configuration having side walls sloping gradually outwardly toward the top. The receptacle may be formed entirely of a material which is a good conductor and radiator of heat, such as metal or metal foil, but preferably, as shown, is a laminated material of which the inner ply 12 is a thin metal foil, sheet, or facing and the outer ply 14 is of paper or other material which is a relatively poor conductor of heat. The bottom 16 of the receptacle is preferably formed entirely of a material which is a good conductor and radiator of heat and may be an integral continuation of the inner ply 12 or, if such ply is not sufficiently strong, may be of metal sheet or foil joined to the peripheral wall of the receptacle 10.

The bottom wall 16 is, as shown, located above the lower edge 18 of the side wall of the container 10, to form a chamber 20. Centrally, the bottom wall 16 is provided with an upwardly extending portion 22 which may conveniently be formed by indenting the central part of the bottom wall 16. Above the portion 22, the bottom wall 16 has a short lateral extension 24 which is joined to, or integral with, a vertically disposed tubular member or chimney 26. Chimney 26 terminates somewhat below the upper edge of the side wall of receptacle 10 and is open at both bottom and top so that it forms a passage leading from the chamber 20 into the receptacle.

Within the chamber 20 and below the chimney 26 is located the heating unit, containing a mixture of chemicals C adapted to react exothermically and emit hot vapors when treated with a suitable quantity of activating liquid. As shown, the heating unit is of a structure disclosed in our aforesaid application, having a container in the form of a dish 28 having a rim 30 at the top and a facing sheet 32 overlying the chemical C in the container and secured to the rim 30. Facing 32 is of thin porous paper, or woven or unwoven fabric, or may be of non-porous thin foil which is punctured at the time the chemical is to be activated. The body of the container 28 is of heavier material such as plastic or metal sheet or foil.

A cover 34 is provided for the receptacle, this being preferably also formed, as shown, of a laminated material, one of the plies 36 being a good conductor and radiator of heat, such as metal, and the other ply 38 a relatively poor conductor and radiator of heat, such as paper. Preferably, as shown, cover 34 is of generally conical shape with the apex of the cone located centrally above the chimney 26. In the position of the cover shown in FIG. 1, the concave side of the cover faces upwardly so that the convex side is exposed to the food within the container. In addition, the cover 34 is provided with corrugations or flutes forming alternate ribs 40 and troughs 42 on the under surface of the cover when positioned as shown in FIGS. 1 and 2a. These flutes or corrugations may be formed in the entire cover as shown, or only in the layer 36 thereof, their functional purpose, as hereinafter described, requiring only their presence in the under face of the cover when positioned as in FIG. 1.

The ribs and troughs 40 and 42 extend radially outwardly from a point adjacent the mid point or apex of the cover. The cover portion overlying chimney 26 is provided with small vapor escape openings 44. A second chimney 46 is attached centrally to the face of the cover which is outward in the position of FIG. 1, said chimney being of an outer diameter slightly less than the inner diameter of the chimney 26 and being co-axial with the chimney 26 when the cover is positioned on the receptacle. The cover may be attached to the receptacle in any convenient manner. As shown, the receptacle side wall is turned outwardly at the top to form a ledge 48 on which the cover rests and on which it may be held by turning thereover the upper edge 50 of the receptacle.

At the base of the receptacle there may be provided, as shown, a member 52 which acts as a bottom closure member for the chamber 20. This closure member may be simply a sheet of cardboard or the like but, as shown, this closure member is a laminated material containing an inner ply 54 of sheet material which is desirably of low heat conductivity such as paper or cardboard, and an outer layer 56 of a highly insulating material such as plastic foam or asbestos. Member 52 may be attached to the receptacle by friction-fitting it within the bottom edge portion 18 of the receptacle. It is important to provide for sufficient escape of vapors from the chamber 20 to prevent pressure build-up therein during activation of the chemical composition C, and to this end, there may be provided apertures 58 through the member 52 adjacent its periphery, the bottom edge 18 being desirably sufficiently irregular to prevent making sealing contact with a surface on which it is rested. A bottom closure member is, of course, not necessary where it is contemplated that the receptacle will be rested on a flat surface during the heating period. However, its use may be desirable, particularly where the receptacle is to be carried about during the heating cycle.

In using the device of FIG. 1, the cover will be removed and food placed in the receptacle to a level below the top of chimney 26. The chemical composition C of the heating unit is activated by applying to the porous face 32 of the container therefor a predetermined initial quantity of water or other activating liquid, which passes therethrough into the chemical. The heating units and the closure members 52 may be provided separately from the receptacles 10, in which case the heating unit may be activated and then friction-fitted into the bottom portion 22, after which the closure member 52 is applied. However, the container may also be supplied with the heating unit and closure member secured in place, in which case the heating unit may be activated by supplying liquid to the face 32 thereof through the open end of the chimney 26. Supplemental activating liquid may also be poured into chimney 26, although with the structure shown in FIG. 1, this will ordinarily be unnecessary.

The reacting chemical C evolves hot vapor, normally steam, the major part of which passes up the chimney 26. Some of this vapor will condense on the wall or chimney 26, in the initial phases of the operation before the chimney becomes fully heated, thereby heating that chimney by heat of condensation, the condensed liquid flowing down the chimney wall to return to the surface 32. Most of the vapor, however, passes out of the top of chimney 26 and laterally through a clearance space 60 between the top of chimney 26 and the under surface of cover 34 into the receptacle 10, wherein it comes into direct contact with the surface of the food and also condenses upon the inner surface of the side wall of the receptacle and on the inner surface of the cover. A minor amount of the vapor passes outwardly through openings 44 and chimney 46, which insures against undersirable pressure build-up within the receptacle.

Due to the downwardly concave formation of the cover, the moisture which condenses on the inner face 36 thereof tends to flow inwardly toward the mid point of the cover. The fluting or corrugations on the inner face of the cover aid this tendency in causing the moisture to collect and flow along the bottom of the ribs 40. The moisture flows to the inner ends of the ribs 40 from which it drips downwardly through chimney 26 returning to the chemical through surface 32. Thus, in accordance with our invention, the cover is made to function as a medium for automatically supplying moisture to the heating chemical through condensataion of vapor emitted from the chemical and returning it to the source.

A portion of the hot vapor emitted from the reacting chemical C passes outwardly and downwardly between the rim 30 of the container and the bottom portion 22 into compartment 20 where it spreads laterally and heats by condensation the area of the bottom 16 which extends laterally beyond the heating unit and beneath the food. If desired, the container rim 30 may be apertured or corrugated to aid such vapor flow. Openings 58 insure that sufficient of this vapor or gas will escape from chamber 20 to prevent pressure build-up therein. The moisture which condenses on the walls of chamber 20 is not returned to the heating unit but this is a relatively small amount compared to that which is condensed and returned by means of the cover 34 and chimney 26.

The material forming the inner layer 36 of the cover should, on its exposed face, have a low resistance to moisture flow. When this surface is aluminum, for example, we have found there is a tendency for the moisture to collect thereon in small discrete drops which tend to cling to the cover instead of flowing inwardly thereon as desired. We have found that the desired low resistance to flow of condensing moisture can be imparted to such a surface by providing thereon a coating adapted to reduce its resistance to flow of the liquid. Such a coating may be, for example, a wetting agent, which may be provided on the inner surface of the cover as a dried coating, or a lacquer or plastic coating having good wetting characteristics. The inner surface of chimney 26 may be similarly treated if desired.

It will be observed that in the embodiment of FIG. 1 the food itself, and the walls in contact with the food, are heated by exposure to the hot vapor emitted from the reacting chemical. Even the outer wall of the receptacle receives heat in this manner, not only by conduction through the bottom 16 but also by virtue of the fact that the upper part of the wall is exposed to this vapor within the receptacle. We have found that such a heating system is extremely efficient and where the activating liquid is water, as is preferred, the temperature of the food will be kept hot at temperatures up to about the boiling point of water for long periods, which are prolonged by the efficient return of condensed moisture to the reacting chemical.

If it is not desired to expose the food in the receptacle to the vapor from the chemical, the cover 34 may simply be reversed from its position of FIG. 1 to that of FIG. 2 wherein chimney 46 fits closely within chimney 26 and acts as a continuation thereof, preventing the vapor from flowing into the receptacle and causing it instead to flow upwardly therein and out apertures 44. In this reversed position of the cover, chimney 46 functions to some extent as a vapor condenser, although not as efficiently as the cover itself in the position of FIG. 1, and this condensed vapor will flow or drip back onto the porous face of the heating unit.

If desired, the chimney 46 and the openings 44 of cover 34 may be dispensed with, as in the cover 34' shown in FIG. 3 applied to the receptacle of FIG. 1, cover 34' being otherwise the same as cover 34. Such vapor escape as is necessary to prevent pressure build-up will take place around the edge of the cover 34' which is not sealed to the receptacle, and cover 34' will function to condense vapor and return the condensate to the heating unit in the same manner as the cover 34 of FIG. 1. There is also provided a second, inner cover 62 of similar concave shape to that of cover 34' and provided centrally with an opening surrounded by a downwardly projecting lip 63 which fits closely within the top of chimney 26. When both covers are in place, the hot vapors escaping from chimney 26 are not exposed to the food but pass outwardly through the space between the two covers which forms a steam chamber, the uncondensed vapor and gases escaping about the edges of the covers. Both covers 34' and 62 here act to return condensed moisture to the heating unit through chimney 26 in the manner described above in connection with cover 34 of FIG. 1. If it is desired to expose the food to the vapors, cover 62 will be omitted and the device functions as in FIG. 1.

The heating chemical C is, in accordance with our invention, so formulated as to emit substantial quantities of vapor which is innocuous to foods, in the sense that liquid condensing therefrom on the food is either free of components which are deleterious to the taste or quality of food, or contains any such components in so small an amount as will not affect the food taste or quality. Such formulations are preferably of the water-activated, oxidation-redutcion type, which may include a metal, an oxidizing agent, a replaceable compound and a filler to prolong the reaction. An example of such a composition which evolves vapors innocuous to foods as above defined and which also includes an adsorbent, is as follows:

| | Percent |
|---|---|
| $CaSO_4 \cdot \tfrac{1}{2} H_2O$ (filler) | 45.3 |
| $KClO_3$ (oxidizing agent) | 17.0 |
| Al (metal) | 34.0 |
| $CuSO_4 \cdot 1H_2O$ (replaceable compound) | 1.3 |
| Activated charcoal (adsorbent) | 2.4 |

The vapors resulting from water activation of the above composition have proved, on analysis, to be only distilled water, substantially free of any detectable contaminants. A small amount of hydrogen may be evolved, but its nature and high volatility prevent its acting as a contaminant of condensing vapor. Adequate gas escape plus the presence of water vapor in the system minimize any accumulation of hydrogen in the system, which might constitute an explosive hazard. Any hydrogen escaping is so diluted by water vapor as not to constitute an explosion hazard.

A similar formula without the adsorbent which is sufficiently innocuous to foods is:

| | Percent |
|---|---|
| $CaSO_4 \cdot \tfrac{1}{2} H_2O$ | 45 |
| $KClO_3$ | 17 |
| Al | 34 |
| $CuSO_4 \cdot 1H_2O$ | 2.5 |
| NaCl | 1.5 |

If it is desired to increase the speed of the reaction of the above formulae, this can be accomplished by increasing the amount of copper sulfate, bearing in mind that small increases in this ingredient produce major changes in the reactivity of the mixture and may cause it to spend its energy considerably before the slower acting mixes specified above. For example, a faster acting mix than the above, but one which will usually "burn out" faster, is as follows:

| | Percent |
|---|---|
| $CaSO_4 \cdot \tfrac{1}{2} H_2O$ | 44 |
| $KClO_3$ | 16 |
| Al | 33 |
| $CuSO_4 \cdot 1H_2O$ | 5 |
| NaCl | 2 |

All of the above formulae produce vapors which are innocuous to foods in the sense that any contaminants that they contain, or which are evolved along with them, are of such nature and in such small amount as to be harmless to the taste or quality of foods to which they are exposed. The adsorbent in the first above formula is helpful in eliminating vapors of a character which, in too great accumulation, might impair the taste or quality of food to which they were exposed. Adsorbents other than activated charcoal may be effectively employed for the same purpose such as alumina or activated alumina, ion exchange resins, magnesium silicate and the like.

As is evident from the foregoing, the rate of steam generation by the above composition may be increased or decreased by increasing or decreasing the concentration of the replaceable compound, copper sulfate in the above examples. Insoluble compounds such as cupric carbonate, cupric oxide, cuprous oxide and metallic copper may replace at least part of the copper sulfate in order to improve the stability of the composition without affecting the suitability of the vapor for contacting foods.

The vapors from the reaction may be made to produce a flavoring as well as a heating function by providing a suitable food flavor which is volatile under the heat and moisture conditions present, so as to be carried along with the vapors into contact with the food. Common flavors such as sage, smoke, onion, hickory, bay leaf, vanilla and numerous others are sufficiently volatile for this purpose. The flavor may be added to the unit at the time of manufacture, preferably by impregnating a porous material, which is exposed to the vapors when the chemical is reacted, with an extract or solution of the flavor. Usually, a few drops is sufficient. Where the heating unit includes a porous absorbent face, the flavor is preferably applied to it. If not, it may be applied to a piece of absorbent material placed within the container or, if the container is made in part of an absorbent plastic, it may be applied to the inner surface of the plastic. While mixing the flavor in dry powdered form with the chemical produces satisfactory volatilization in some cases, there is a possibility of undesirable side reaction with the chemicals which makes it preferable to employ a separate carrier for the flavor.

In addition to flavoring or spicing the food desirably, the volatile flavor provides a pleasing, appetizing odor. While the preferred chemical mixtures of the invention are free of mal-odor as well as innocuous to foods, if formulae are used which involve some slight mal-odor, the food flavor aroma can effectively mask it, both to the sense of smell and to the sense of taste should it have some slight tendency adversely to affect the taste of the food.

While we prefer to form the chemical container as a separate attachable unit as shown in FIGS. 1 and 4 it will be appreciated that it may be an integral part of the receptacle bottom, for example by forming the container wall 28 as an integral part of, or joining it permanently to, the bottom 16. If this is done it is desirable to form a portion of the wall 28 as well as facing 32 of pervious material, so that hot vapors will pass into chamber 20 as well as out chimney 26. Also, while the receptacle 10 is shown as of circular cross section, its shape is optional and it may be square, rectangular, etc.

FIGS. 5 and 6 illustrate an alternative embodiment which, like that of the previous figures, so effectively utilizes and re-uses the vapor generated by exothermic reaction for heating, that a small heating unit of the chemical may be utilized to heat a relatively large container of food.

In this embodiment there are provided two receptacles, one nesting within the other, the inner receptacle being adapted to contain the food F to be heated. The outer receptacle 70 has a side wall 72 having a portion 74 thereof turned back upon itself at its lower edge, and a bottom 76 resting on, or connected to the upper edge of, the turned-up portion 74. Bottom 76 is concave upwardly from its ends to a central flat area 78 lowermost but still above the plane of the bottom edge of side wall 72. Thus the entire bottom will be supported out of contact with any flat surface on which the bottom edge of side wall 72 may be placed, as is desirable.

Wall 72 and bottom 76 may be formed of metal sheet or foil but more desirably are formed of an insulating material which is a relatively poor conductor of heat, such as cardboard or plastic, or of a laminate of such material with an inner ply of metal, as in the embodiment of FIG. 1. The receptacle may be formed or molded as a single piece, or the bottom and side walls may be formed of separate pieces joined together at, or adjacent, the upper edge of portion 74, or the bottom 76 may be loosely assembled with the wall 72 resting on the upper edge of portion 74.

Wall 72 may be bent outwardly near its top to form a ledge 80 on which a cover 82 may be supported and held by turning thereover the upper edge of said wall. Cover 82 is concave on its under side, sloping downwardly at its sides and ends from a centrally arched portion. The cover may be provided with vent openings if desired, but this will not be necessary in a construction such as shown, wherein the cover is not fastened to the receptacle in such a way as to prevent vapor escape from around its edges.

The inner container 86 is shaped and dimensioned to fit closely, removably within the outer container 70. It is preferably formed of metal, such as aluminum foil, or of plastic, or of other heat-conductive material. It has a side wall 88 and bottom 90, which are shaped to conform to the inner surface of the wall and bottom of the outer container 70. Bottom 90 is, like bottom 76, concave upwardly from its ends toward the middle, but is provided with a central portion 92, overlying the flat central portion 78 of bottom 76, which is indented upwardly, so that it is convex on the inner side. Preferably, as shown, bottom 90 is provided with longitudinally extending corrugations or flutes 94 which are also extended up the side wall 88, at the ends of the receptacle (see FIG. 6), for a purpose hereinafter described. The upper portion of side wall 88 is shaped to provide a ledge 96 on which the edge of a cover 98 may be seated and held by folding thereover the upper edge of said wall.

The portions 78 and 92 of the two receptacle bottoms provide between them a compartment for receiving a chemical heating unit 100 containing a chemical composition C for emitting heat and hot vapors by exothermic reaction, as in the previously described embodiment. This unit may, as shown, be a pad, formed separately from the receptacles, containing the chemical and formed of a material which is moisture-pervious or of foil or the like which may be readily punctured to provide openings for the entrance of activating liquid and escape of vapors and gases.

In the use of this embodiment, heating unit 100, either before or after activation with a predetermined initial quantity of activating liquid, is placed on bottom portion 78 of the outer receptacle 70 and when such activating liquid has been applied, the inner receptacle containing the food F to be heated is telescoped within the outer one, with the indented bottom portion thereof overlying the unit 100 and serving to retain it against lateral movement. The hot vapor escaping from the unit 100 flows laterally between the bottom 90 of the inner container and the bottom 76 of the outer container and upwardly between the side walls 88 and 72 of the two containers. The substantially tubular ducts formed by corrugations or flutes 94 of bottom 90 of the inner container and bottom 76 of the outer container greatly aid this flow and cause it to take place mainly in the longitudinal direction wherein, in the rectangular receptacle shape illustrated, food most remote from the heating unit is located.

Vapor which does not condense as it flows between the two receptacles, and uncondensable gases, if any, pass upwardly from between their side walls. If both covers 98 and 82 be in place as shown, these vapors and gases will fill the space or chamber between the two covers, the vapors condensing in part on the outer surface of cover 98 and the inner surface of cover 82 and some, together with uncondensable gases, escaping around the edge of the cover. If the cover 98 is left off but the cover 82 is in place, the vapors passing upwardly from between the two receptacles are caused in part to contact the upwardly exposed surface of the food in the inner container and thereby directly heat it. Cover 98 is preferably made of a material which is a good conductor and radiator of heat so that, when it is used, the heat imparted thereto by condensation of vapor on its outer surface is effectively transmitted to the food in the inner container.

Moisture condensing on the inner surface of outer cover 82 tends to flow outwardly toward the outer edges of the cover, due to the shape of the cover, most of the flow taking place in the longitudinal direction. From the cover edge this condensed liquid flows downwardly between the receptacle side walls 88 and 72 along with liquid of vapor which has condensed on the outer and inner surfaces respectively of the side walls. Since the bottoms of the two receptacles slope downwardly from their ends toward their mid-portions, liquid flowing down their side walls at the ends of the receptacles tends to flow inwardly to the central portion thereof, being augmented by additional liquid which has condensed on the bottoms of the two receptacles. Thus, a substantial part of the condensable vapors emitted by the heating unit are utilized for heating by condensation and are then returned by gravity flow for re-use by the heating unit which absorbs them through its porous covering, as in the embodiment of FIG. 1. The flutes or corrugations 94 aid this inward flow of recycling liquid, as well as the outward flow of gases and vapors, and in addition increase the area of bottom and side wall of the inner container which is exposed to vapor heating. The surface relied on for return flow of condensed liquid may be treated to facilitate liquid flow, as in the embodiment of FIG. 1.

It will be noted that the embodiment of FIG. 5, like that of FIG. 1, is capable of exposing the food to direct contact with the vapors from the chemical reaction, or of shielding the food from such exposure, depending upon whether or not the inner cover 98 is applied. It will also be noted that in this embodiment the entire outer surface of the inner receptacle is heated by exposure to the hot vapors from the exothermically-reacting chemical composition. The system is so efficient, particularly with provision for return of condensed liquid, that the dimensions of the heating unit may be quite small compared to those of the receptacle which it heats, as indicated in the drawing.

FIG. 7 shows an embodiment of our invention in which continued automatic replenishment of vaporized activating liquid is provided for, otherwise than by return of condensed liquid, this device being otherwise similar in many respects to the embodiment of FIG. 5.

This embodiment has outer and inner receptacles, with a heating unit located between them, these receptacles being shown as of circular cross-section, although other shapes may be employed. The outer receptacle has a side wall 110 outwardly inclined toward the top and terminating at the base in a substantially vertical portion 112 to which is connected, integrally as shown, or otherwise, a substantially flat bottom 114. This outer receptacle may be formed of any of the materials referred to as suitable for the outer receptacle of the embodiment of FIG. 5, but preferably is of heat-insulating material, at least on the outside.

The inner container, which preferably is formed of a good heat conducting and radiating material, has a side wall 116 of complementary shape to the side wall 110 of the outer container, but of smaller depth and appreciably smaller diameter in its upper portion. At the bottom of side wall 116 is provided a substantially vertical extension 118 having an outside diameter closely fitting the inner surface of wall portion 112 of the outer receptacle, and of sufficient length so that its upper edge is spaced above the upper edge of portion 112 when interfitted therewith. The bottom of the inner container has a flat marginal portion 120 connected to the side wall at the upper edge of extension 118, and a central portion 122 which is indented upwardly or otherwise formed to provide a downwardly opening recess for receiving the upper part of a heating unit, as in the device of FIG. 1. A cover 124 for the outer receptacle has a down-turned rim 126 adapted to fit over the upper edge of the outer receptacle wall 110. The upper end of extension 118 is provided with vapor escape openings 128 spaced around its periphery.

The heating unit for this embodiment comprises a cup-shaped container 130 similar to that of the unit shown in FIG. 4 and provided with an outwardly extending rim 132 at its upper edge. The chemical C is confined within a porous or pierceable material 136 forming a pad of slightly smaller dimensions than the container and resting on the bottom thereof. The rim 132 of container 130 is adapted to seat with a friction fit into the edge of the recess beneath bottom portion 122 to attach the container with its chemical-containing pad to the receptacle. Rim 132 may be provided with vertical openings therethrough or with a scalloped edge to facilitate vapor flow outwardly and downwardly from the container.

In the use of this embodiment, the heating unit is activated by means of activating liquid applied to the upper face of the porous material 136 of the heating pad resting in the container 130. The quantity of liquid applied may exceed the absorptive capacity of the pad and if it does such excess up to a limited amount will be retained within the space between the pad and the surrounding wall of container 130. The heating unit thus activated is now attached to the bottom of the food containing inner receptacle which is then nested within the outer receptacle.

Vapor from the reacting chemical C passes upwardly through facing 136 and laterally and downwardly about rim 132. Thus the hot vapor passes under the bottom portion 120 and out openings 128 into the space provided between walls 116 and 110 by the appreciable difference in diameter of the two walls. If cover 126 is in place, the vapor flowing upwardly from between the side walls of the two containers will flow inwardly under the cover and contact the exposed surface of the food in the container, directly heating it. An additional cover (not shown) may be provided for the inner container as in the embodiment of FIG. 5, which will shield such vapors from the food when that is desired and confine them to the space between the two covers.

In this embodiment, liquid condensed in the device is not returned to the vapor generating composition except such minor amount as may condense on the under surface of portion 122 and drop back through facing 136. However, if excess liquid has been applied, a substantial part of the activating liquid escaping from the heating unit as vapor is continually replaced by liquid from the excess supply in container 130. The amount of excess liquid in contact with the pad at any time is, as in the case of the embodiments previously described, small, so that it does not significantly impair the heating efficiency of the unit as a larger quantity would tend to do, while its presence does aid by prolonging the heating cycle.

In FIG. 8 we illustrate our invention applied to keeping foods hot in a so-called "hot-plate." In the embodiment of FIG. 8, the heating unit comprises a base 150 provided with feet 152 by which it may be set on a table or other supporting surface. Base 150 may be of metal or of a material other than metal and of relatively low heat conductivity such as Bakelite or other plastic. Interiorly, base 150 has a concavity 154 opening upwardly, the rim of which is provided with transverse openings 156 for the outward escape of gases and vapors from within concavity 154. A heating unit 157 is located in the bottom of concavity 154, comprising a chemical composition C capable of emitting hot vapor by exothermic reaction. This chemical may, as shown, be enclosed in, or may be at least in part surrounded by, a material which is pervious to liquid.

When the heating unit is activated by a suitable quantity of activating liquid, the composition C will give off hot vapor some of which will condense on any surface placed over the top of concavity 154, such as the bottom of a plate which it is desired to warm or which contains foods to be warmed or kept hot. Some of the vapor will condense on such surface and drip back into concavity 154, the walls of which are shaped to cause such liquid, and the liquid from any vapor condensing therein, to flow towards its central portion where they may be reabsorbed into the chemical through the porous facing material of the heating unit. Vapor escaping through the openings 156 will serve to keep the pressure within the concavity 154 from building up to a pressure above atmospheric and prevent the accumulation of gaseous byproducts of the reaction, which would tend to stop the exothermic reaction of the chemical mixture C, and might also include sufficient gas such as hydrogen to constitute an explosive hazard.

To use most efficiently the vapor heating provided by the base 150 and its heating unit we prefer to apply thereto a warming plate of special construction as shown in FIG. 8. As shown, this plate, preferably formed of metal or other good heat conductor, has an upwardly concave or dished body 158 which, adjacent its outer edge, seats on the rim of said concavity. Preferably, the central portion of the plate is provided with an opening surrounded by a chimney 160 extending vertically toward, to, or above the plane of the upper edge of the plate. This chimney is open at the top but may be provided with a removable cap 162. The plate may be provided with a removable cover 164, shown in dotted lines.

In use of the complete device shown in FIG. 8, the heating unit is placed within the concavity 154 and activated with a suitable initial quantity of activating liquid up to or slightly exceeding the absorptive capacity of the unit. The steam or other hot condensible vapor heats and condenses on the bottom portion of the plate overlying concavity 154 and also tends to flow downwardly thereon toward the opening into chimney 160, dripping from the edge of the opening onto the heating unit, and returning through the porous surface thereof to the chemical C. Vapor condensing on the wall of the concavity 154 also tends to return to the chemical C of the heating unit by gravity flow as above described. In addition, vapor flows up chimney 160, and if cap 162 be removed and cover 164 applied, this vapor will be exposed to direct heat exchange relation with the food F within the dish. The vapor condensing within chimney 160, and if cap 162 be applied thereto, on the under surface of said cap, tends to flow and drip downwardly onto unit 157 and to be absorbed through the porous surface thereof into the chemical C.

Thus chimney 160 can function, together with cover 164, as a means for causing vapor evolved by the heating unit to contact the outer surface of food in the dish and thereby aid in heating the food. In addition, chimney 160 provides additional heated surface in contact with the food to increase the heating efficiency of the unit and also, particularly when the cap 162 is applied thereto, provides additional vapor condensing surface, in heat exchange relation with the contents of the dish, from which the condensed liquid is returned to the heating unit to promote and prolong the efficient reaction of the chemical contents thereof.

FIG. 9 shows another form of hot plate in the form of a substantially flat plate 170 such as an ordinary serving or dinner plate and which may be of china, ceramic ware, metal, plastic or the like. Centrally, the bottom of the plate has a depending annular ridge 172 which is slanted or curved on its inner face to provide a groove for receiving the rim 174 of the container 176 of a heating unit such as illustrated in FIG. 4 or 7, as shown, container 17 being like that of FIG. 7 and containing a pad of the chemical C with space provided for excess activating liquid. Rim 174 is sufficiently flexible to spring-fit within ridge 172 but is corrugated or otherwise irregularly formed to provide for free vapor escape outwardly and downwardly between the rim and the ridge. Surrounding the ridge 172 is a second depending ridge 178 on which the plate is supported when placed on a flat surface. Ridge 178 has sufficient height to extend below the bottom of the container of the heating unit so as to support the latter out of contact with a flat underlying surface. To prevent ridge 178 from forming a vapor-tight chamber between the plate and a supporting flat surface, transverse openings are provided therethrough such as by scallops 180 formed in its lower edge.

In using the embodiment of FIG. 9, the activating liquid is applied to the chemical in the container and the heating unit is attached to the bottom of the plate in the manner described above. If the plate be set on a flat surface as shown, ridge 178 and the plate bottom form therewith a chamber into which the vapor flows from the heating unit, heating the plate bottom between ridge 178 and the heating unit as well as that overlying the heating unit, and ultimately escaping if not condensed via the openings provided by scallops 180. If it be desired to expose the food on the plate to direct contact with the vapor passing outwardly beyond ridge 178 an enclosure for the plate may be provided such as a cover (not shown) similar to that of FIG. 8, of such size as to cover and surround the plate with its edge resting on the supporting flat surface, thus forming with that surface a steam chamber enclosing the plate.

We have found that our preferred heating compositions operate most effectively for our purpose when they are supplied with from about one-fifth their weight up to about an equal weight of water. Normally, we employ about one to two ounces of the chemical mixes specified above per heating unit and these will absorb close to their weight of water, but the container for the heating chemical or heating unit is preferably so designed as to retain such excess of water over the absorptive capacity of the chemical mix as it is desired to apply at the outset.

Having described preferred embodiments of our invention, what we desire to claim and secure by Letters Patent is:

1. For use in the heating of food, the combination of a receptacle for containing the food, a dry chemical composition adapted in the presence of water to react exothermically and to emit steam, said chemical composition being so constituted that said steam is free of adulterants in sufficient quantity to contaminate the food, means for supporting and confining said composition beneath the bottom of the receptacle and for forming a passage for directing steam generated by said composition into said receptacle to heat the food therein by direct exposure to a surface of the food, said passage comprising as a wall thereof a substantial part of the wall area of said receptacle that is in contact with the food so that said wall area is heated by steam flowing through said passage.

2. The combination according to claim 1 wherein said means includes a hollow tubular duct member in said receptacle opening through the bottom thereof and rising above the level of the food therein, said member having its inlet end exposed to steam issuing from said composition and its outlet end disposed to discharge steam therefrom into the interior of said receptacle.

3. The combination according to claim 2 wherein said duct member is disposed over said composition in the assembly, and wherein said receptacle is provided with a cover so shaped that water formed by condensation of steam thereon is caused to flow thereon to a zone above said duct member and to drip therefrom through said duct to return to said chemical composition.

4. The combination according to claim 1 wherein said receptacle has an upstanding side wall surrounding its bottom, and said means includes at least one wall member disposed beneath said receptacle bottom and surrounding said side wall for at least a substantial part of its height to form therewith said passage.

5. The combination according to claim 1 wherein said means includes means for optionally preventing the flow of steam from said passage into said receptacle.

6. The combination according to claim 1 which includes a food flavor associated with said composition so as to be volatilized by heat generated by said composition into said steam.

7. A device for heating a material such as food comprising, in combination, a container of a dry chemical composition adapted upon application thereto of water to react exothermically and to emit steam in such quantities as to reduce the amount of water in said container below that needed to activate the chemical completely, said container being adapted when in use to permit water to pass therethrough to said chemical and steam to escape therefrom, a receptacle for receiving said material to be heated, and means for supporting and confining said container beneath said receptacle, said means including a concave closure member fitting the external surface of said receptacle around at least the major portion of its wall area in contact with the material to be heated to form therewith a chamber into which the steam from said container is discharged and flows directly into condensation heat-exchange relation with the chamber walls, at least a substantial part of the wall area of said chamber being so disposed and associated with said container as to cause water of said steam condensing thereon to return by gravitational flow to a portion of said container through which it may pass into said composition and increase the extent of activation thereof.

8. A device according to claim 7 wherein said part of the wall area of said chamber comprises said portion of the wall area of said receptacle.

9. A device according to claim 8 wherein said portion of the wall area of said receptacle includes a bottom wall of said receptacle inclined downwardly to a point adjacent said container.

10. A device according to claim 7 wherein said part of the wall area of said chamber is provided with corrugations to improve the gravitational flow of the liquid.

References Cited in the file of this patent

UNITED STATES PATENTS

| | | |
|---|---|---|
| 703,269 | Hutchings | June 24, 1902 |
| 865,940 | Randolph | Sept. 10, 1907 |
| 1,279,205 | Wolff | Sept. 17, 1918 |
| 1,590,289 | Donovan | June 29, 1926 |
| 1,910,874 | Ziegler et al. | May 23, 1933 |
| 2,033,517 | Gazda | Mar. 10, 1936 |
| 2,497,612 | Katzman | Feb. 14, 1950 |
| 2,596,664 | Durham et al. | May 13, 1952 |
| 2,906,191 | Lee | Sept. 29, 1959 |
| 2,984,171 | Lee | May 16, 1961 |
| 3,019,783 | Clarke | Feb. 6, 1962 |

FOREIGN PATENTS

| | | |
|---|---|---|
| 24,270 | Great Britain | of 1910 |
| 566,188 | Great Britain | Dec. 18, 1944 |
| 733,814 | Great Britain | July 20, 1955 |